United States Patent
Li

(10) Patent No.: US 11,714,099 B2
(45) Date of Patent: Aug. 1, 2023

(54) MAGNETIC ROLLER DEVICE AND ROTATION INFORMATION CALCULATING METHOD THEREOF

(71) Applicant: Hanvon Ugee Technology Co., Ltd., Guangdong (CN)

(72) Inventor: Yuanzhi Li, Guangdong (CN)

( * ) Notice: Subject to any disclaimer, the term of this patent is extended or adjusted under 35 U.S.C. 154(b) by 499 days.

(21) Appl. No.: 16/964,233

(22) PCT Filed: Mar. 9, 2018

(86) PCT No.: PCT/CN2018/078593
§ 371 (c)(1),
(2) Date: Jul. 23, 2020

(87) PCT Pub. No.: WO2019/144473
PCT Pub. Date: Aug. 1, 2019

(65) Prior Publication Data
US 2020/0355720 A1    Nov. 12, 2020

(30) Foreign Application Priority Data
Jan. 23, 2018 (CN) .......................... 20181006216.X

(51) Int. Cl.
*G01P 3/487* (2006.01)
*G06F 3/0362* (2013.01)
*G01D 5/14* (2006.01)

(52) U.S. Cl.
CPC .............. *G01P 3/487* (2013.01); *G01D 5/142* (2013.01); *G06F 3/0362* (2013.01)

(58) Field of Classification Search
CPC .. G01P 13/04; G01P 3/44; G01P 3/487; G01P 13/045; G06F 3/03547; G06F 3/0362; G01D 5/142; G01D 5/145
See application file for complete search history.

(56) References Cited

U.S. PATENT DOCUMENTS

| | | | |
|---|---|---|---|
| 2011/0025311 A1* | 2/2011 | Chauvin | G06F 3/0362 29/729 |
| 2011/0241657 A1* | 10/2011 | Nishiono | G06F 3/03549 324/207.13 |
| 2014/0275780 A1* | 9/2014 | Feingold | A61B 1/042 600/117 |

FOREIGN PATENT DOCUMENTS

| CN | 2713545 Y | 7/2005 |
|---|---|---|
| CN | 101110000 A | 1/2008 |

(Continued)

OTHER PUBLICATIONS

JP—Notification of Reason for Refusal—Jul. 20, 2021.
JP—Notification of Reason for Refusal—dated Feb. 1, 2022.
EP—Extended European Search Report.

*Primary Examiner* — Nelson M Rosario
(74) *Attorney, Agent, or Firm* — Warshaw Burstein, LLP

(57) ABSTRACT

A magnetic roller device and a method for calculating rotation information thereof are disclosed. The magnetic roller device includes a multipole magnet, an MCU, plurality of Hall components, and a roller disposed on a handwriting device, wherein the multipole magnet is disposed on the roller, the multipole magnet includes at least one pair of magnetic poles with opposite polarities, and output ends of the plurality of Hall components are connected to an input end of the MCU; the plurality of Hall components are all located on a same plane of a magnetic field sensing space of the multipole magnet, and distances between each of the plurality of Hall components and the multipole magnet are equal; and a distance between two adjacent ones of the plurality of Hall components is less than half of a width of each magnetic pole in the multipole magnet.

6 Claims, 5 Drawing Sheets

(56) References Cited

FOREIGN PATENT DOCUMENTS

| | | |
|---|---|---|
| CN | 101505325 A | 8/2009 |
| CN | 201535896 U | 7/2010 |
| CN | 201654704 U | 11/2010 |
| JP | 2001004405 | 1/2001 |
| JP | 2003166854 A | 6/2003 |
| JP | 2003280799 A | 10/2003 |
| JP | 2010191811 A | 9/2010 |
| JP | 2011033387 A | 2/2011 |
| JP | 2017174028 A | 9/2017 |
| WO | 2008145662 A1 | 12/2008 |

* cited by examiner

MAGNETIC ROLLER DEVICE AND ROTATION INFORMATION CALCULATING METHOD THEREOF

CROSS-REFERENCE TO RELATED APPLICATIONS

This application is a national stage filing under 35 U.S.C. § 371 of international application number PCT/CN2018/078593, filed Mar. 9, 2018, which claims priority to Chinese patent application No. 201810062126.X filed Jan. 23, 2018. The contents of these applications are incorporated herein by reference in their entirety.

TECHNICAL FIELD

The present invention relates to the field of handwriting devices, and in particular, to a magnetic roller device and a rotation information calculating method thereof.

BACKGROUND

Rollers are widely used in the market of handwriting tablets. The rollers are generally used for continuous data adjustment, which are very convenient and intuitive to use. At present, the commonly used rollers mainly include mechanical rollers and touch rollers. Although the mechanical rollers have stable characteristics, they are large in size and occupy lots of space of the circuit boards. In contrast, although the touch rollers are relatively light, they are easy to be disturbed and mistakenly touched and have problems such as poor production consistency.

SUMMARY

To address the above technical problems, the present invention aims at providing a magnetic roller device, which is small in size, is not easy to be disturbed and mistakenly touched, and has excellent production consistency, and a method for calculating rotation information thereof.

The first technical scheme adopted in the present invention is as follows: A magnetic roller device, which includes: a multipole magnet, an MCU, a plurality of Hall components, and a roller disposed on a handwriting device, wherein the multipole magnet is disposed on the roller, the multipole magnet includes at least one pair of magnetic poles with opposite polarities, and output ends of the plurality of Hall components are all connected to an input end of the MCU.

Further, the plurality of Hall components are all located on the same plane of a magnetic field sensing space of the multipole magnet, and distances between each of the plurality of Hall components and the multipole magnet are equal.

Further, the distance between two adjacent ones of the plurality of Hall components is less than half of the width of each magnetic pole in the multipole magnet.

Further, the multipole magnet rotates in a direction perpendicular or parallel to the position of each of the Hall components.

Further, the multipole magnet is a radial magnet or an axial magnet.

Further, the plurality of Hall components each include a Hall sensor capable of outputting an analog quantity or a digital quantity.

Further, the plurality of Hall components are packaged in the same IC chip or packed in different IC chips, respectively.

The second technical scheme adopted in the present invention is as follows:

A method for calculating rotation information of a magnetic roller device, which includes the following steps:

acquiring, by a plurality of Hall components, corresponding electrical signals during rotation of a multipole magnet and sending same to an MCU, wherein the multipole magnet includes at least one pair of magnetic poles with opposite polarities, distances between each one of the plurality of Hall components and the multipole magnet are equal, and the plurality of Hall components are all located on the same plane of a magnetic field sensing space of the multipole magnet; and judging and calculating, by the MCU, according to the electrical signals acquired by the plurality of Hall components to obtain rotation information of the multipole magnet, the rotation information including position information and rotational speed information.

Further, the step of judging and calculating, by the MCU, according to the electrical signals acquired by the plurality of Hall components to obtain rotation information of the multipole magnet specifically includes:

selecting, by the MCU, any two adjacent Hall components from the plurality of Hall components;

judging, by the MCU, according to sizes of electrical signals of the selected Hall components to determine a rotation direction and a current position of the multipole magnet; and calculating, by the MCU, a rotational speed of the multipole magnet according to electrical signal variation of the selected Hall components.

Further, the step of judging, by the MCU, according to sizes of electrical signals of the selected Hall components to determine a rotation direction and a current position of the multipole magnet is specifically:

judging whether the electrical signals of the two selected Hall components are equal in size, and if yes, determining that the center of the current magnetic pole of the multipole magnet is in the middle of the two Hall components; and otherwise, determining that the multipole magnet is rotating toward the direction of the Hall component with the larger electrical signal, wherein the distance between the two selected Hall components is less than half of the width of each magnetic pole in the multipole magnet.

Further, the step of calculating, by the MCU, a rotational speed of the multipole magnet according to electrical signal variation of the selected Hall components specifically includes:

acquiring, by the MCU, electrical signal variation of any of the selected Hall components within a preset time; and calculating, by the MCU, the rotational speed of the multipole magnet according to the acquired electrical signal variation and the preset time.

The present invention has the following beneficial effects: according to the magnetic roller device and the method for calculating rotation information thereof in the present invention, the magnetic roller device composed of a multipole magnet and a roller performs data adjustment of a handwriting device in place of a mechanical roller and a touch roller, and rotation information of the magnetic roller device is calculated and acquired in conjunction with plurality of Hall components and an MCU, which overcomes the defect that the mechanical roller is large in size and solves the problem that the touch roller is easy to be disturbed and mistakenly touched and has poor production consistency.

The magnetic roller device is small in size, is not easy to be disturbed and mistakenly touched, and has excellent production consistency.

DETAILED DESCRIPTION

The present invention discloses a magnetic roller technology applied to a handwriting device, which implements continuous data reading and writing of the handwriting device by using plurality of Hall components in conjunction with an MCU and a multipole magnet fixed to a roller. During rotation, the roller drives the multipole magnet to produce a changing magnetic field. The changing magnetic field interacts with the plurality of Hall components in fixed positions to produce a Hall effect. The hall components are in different positions, so Hall voltages (phase, current, etc.) sensed by the Hall components at the same time are all different. The MCU judges and acquires, according to this phenomenon, a difference between signals output by the Hall components, and then judges and calculates rotation information of the multipole magnet (i.e., the roller).

The present invention is further explained and described below with reference to the accompanying drawings of the specification and a specific embodiment.

Figure 1:
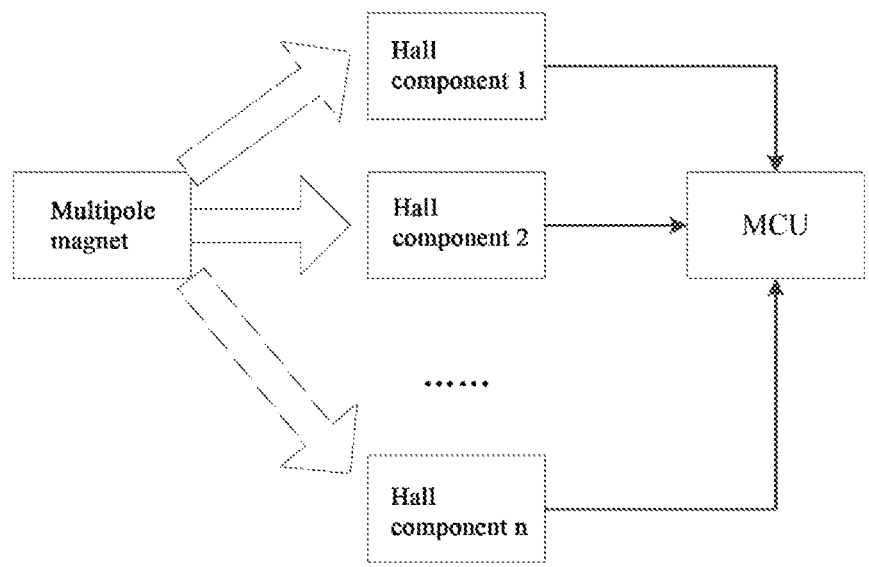
FIG. 1 is an overall structural block diagram of a magnetic roller device according to the present invention.

Referring to FIG. 1, a magnetic roller device in this embodiment includes a multipole magnet, an MCU, a plurality of Hall components, and a roller disposed on a handwriting device. The multipole magnet is disposed on the roller, the multipole magnet includes at least one pair of magnetic poles with opposite polarities, and output ends of the plurality of Hall components are all connected to an input end of the MCU. The plurality of Hall components include a Hall component 1, a Hall component 2, . . . , and a Hall component n, where n is an integer greater than or equal to 2. The number of the pairs of magnetic poles in the multipole magnet may be 1, 2, 3, . . . .

Further as a preferred embodiment, the plurality of Hall components are all located on the same plane of a magnetic field sensing space of the multipole magnet, and distances between each of the plurality of Hall components and the multipole magnet are equal.

Further as a preferred embodiment, the distance between two adjacent ones of the plurality of Hall components is less than half of the width of each magnetic pole in the multipole magnet.

In this embodiment, the plurality of Hall components are disposed on the same plane of a magnetic field sensing space of the multipole magnet, distances between the Hall components and the multipole magnet are equal, and the distance between two adjacent ones of the plurality of Hall components is less than half of the width of each magnetic pole in the multipole magnet, with the purpose of making a signal difference between the plurality of Hall components and facilitating the subsequent calculation of rotation information by using a unified standard.

Referring to FIG. 2, FIG. 3, FIG. 4, FIG. 5, FIG. 6, and FIG. 7, further as a preferred embodiment, the rotation direction of the multipole magnet 1 is perpendicular or parallel to the position of each of the Hall components 2.

Figure 2:
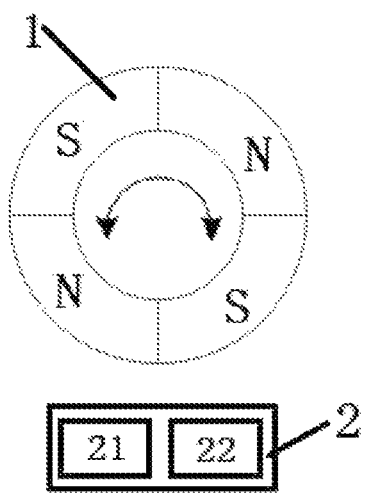
FIG. 2 is a first structural diagram when the rotation direction of a multipole magnetic is perpendicular to the position of a Hall component.
Figure 3:
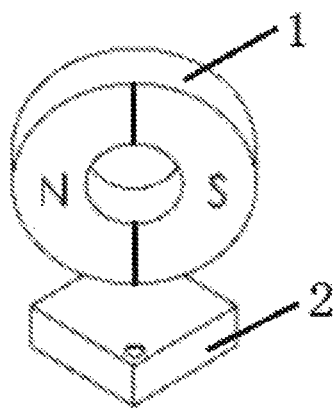
FIG. 3 is a schematic spatial structural diagram when the rotation direction of a multipole magnetic is perpendicular to the position of a Hall component.
Figure 4:
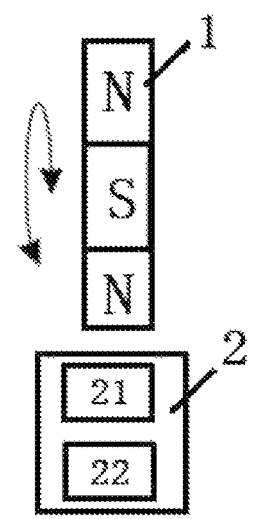
FIG. 4 is a second structural diagram when the rotation direction of a multipole magnetic is perpendicular to the position of a Hall component.
Figure 5:
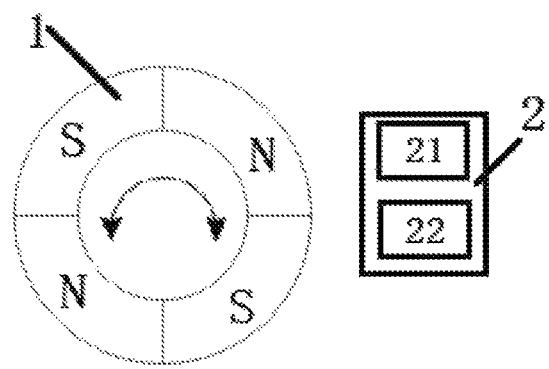
FIG. 5 is a first structural diagram when the rotation direction of a multipole magnetic is parallel to the position of a Hall component.
Figure 6:
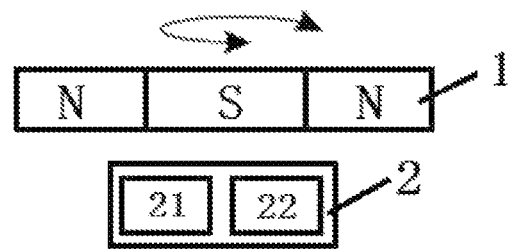
FIG. 6 is a second structural diagram when the rotation direction of a multipole magnetic is parallel to the position of a Hall component.
Figure 7:
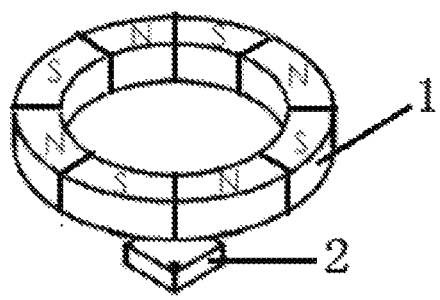
FIG. 7 is a schematic spatial structural diagram when the rotation direction of a multipole magnetic is parallel to the position of a Hall component.

In FIG. 2 to FIG. 7, the Hall components 2 each include a Hall component 21 and a Hall component 22. Those skilled in the art may understand that the number of the Hall components 2 in the utility model may also be 3 or more than 3. In FIG. 2, FIG. 3, and FIG. 4, the rotation direction of the multipole magnet 1 is in a vertical relation with the positions of the Hall components 2, while in FIG. 5, FIG. 6, and FIG. 7, the rotation direction of the multipole magnet 1 is in a horizontal relation with the positions of the Hall components 2.

Figure 8:
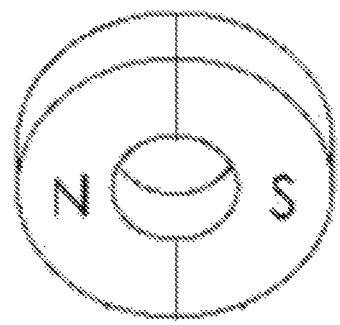
FIG. 8 is a schematic structural diagram of a radial magnet.
Figure 9:
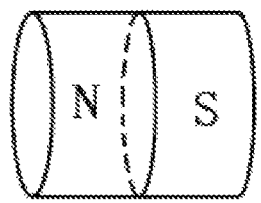
FIG. 9 is a schematic structural diagram of an axial magnet.

Referring to FIG. 8 and FIG. 9, further as a preferred embodiment, the multipole magnet 1 is a radial magnet or an axial magnet. It is a radial magnet in FIG. 8 and an axial magnet in FIG. 9, which can be flexibly selected by users.

Further as a preferred embodiment, the plurality of Hall components each include a Hall sensor capable of outputting an analog quantity or a digital quantity.

In this embodiment, a linear Hall sensor may be selected as the Hall sensor, which consists of a Hall element, a linear amplifier, and an emitter follower, and outputs an analog quantity. A switch Hall sensor may also be selected as the Hall sensor, which consists of a voltage regulator, a Hall element, a differential amplifier, a Schmidt flip-flop, and an output stage, and outputs a digital quantity.

Further as a preferred embodiment, the plurality of Hall components are packaged in the same IC chip or respectively in different IC chips. Centralized packaging or separate packaging may be selected for the plurality of Hall components in this embodiment according to actual requirements, which is very flexible and convenient.

In addition, the plurality of Hall components in this embodiment may be disposed directly under the multipole magnet, or not directly under the multipole magnet, as long as the plurality of Hall components can sense magnetic field changes.

Output of the plurality of Hall components in this embodiment is connected to the MCU, and after a program in the MCU makes judgment and calculation, rotation information (including rotational speed, rotation direction, etc.) of the roller can be sent.

Corresponding to the magnetic roller device in FIG. 1, this embodiment further provides a method for calculating rotation information of a magnetic roller device, including the following steps:

acquiring, by a plurality of Hall components, corresponding electrical signals during rotation of a multipole magnet and sending them to an MCU, wherein the multipole magnet includes at least one pair of magnetic poles with opposite polarities, distances between each of the plurality of Hall components and the multipole magnet are equal, and the plurality of Hall components are all located on the same plane of a magnetic field sensing space of the multipole magnet; and judging and calculating, by the MCU, according to the electrical signals acquired by the plurality of Hall components to obtain rotation information of the multipole magnet, the rotation information including position information and rotational speed information.

the electrical signals acquired by the plurality of Hall components may be digital voltage signals or analog voltage signals, depending on the type of the Hall sensor selected for the Hall components.

Further as a preferred embodiment, the step of judging and calculating, by the MCU, according to the electrical signals acquired by the plurality of Hall components to obtain rotation information of the multipole magnet specifically includes:

selecting, by the MCU, any two adjacent Hall components from the plurality of Hall components;

making judgment, by the MCU, according to sizes of electrical signals of the selected Hall components to determine a rotation direction and a current position of the multipole magnet; and calculating, by the MCU, a rotational speed of the multipole magnet according to electrical signal variation of the selected Hall components.

Further as a preferred embodiment, the step of making judgment, by the MCU, according to sizes of electrical signals of the selected Hall components to determine a rotation direction and a current position of the multipole magnet is specifically:

judging whether the electrical signals of the two selected Hall components are equal in size, and if yes, determining that the center of the current magnetic pole of the multipole magnet is in the middle of the two Hall components; and otherwise, determining that the multipole magnet is rotating toward the direction of the Hall component with the larger electrical signal, wherein the distance between the two selected Hall components is less than half of the width of each magnetic pole in the multipole magnet.

In this embodiment, the plurality of Hall components are disposed on the same plane of a magnetic field sensing space of the multipole magnet, distances between each of the Hall components and the multipole magnet are equal, and the distance between the two selected Hall components is less than half of the width of each magnetic pole in the multipole magnet, with the purpose of making a signal difference between the plurality of Hall components and facilitating the subsequent calculation of rotation information by using a unified standard. During rotation of the magnetic roller, there will always be a signal difference because the Hall components are disposed in different positions.

The multipole magnet is constantly rotating, while the positions of the plurality of Hall components are fixed, so the poles interacting with each Hall component at different times are different. Therefore, the position of the current magnetic pole in the multipole magnet needs to be determined.

Further as a preferred embodiment, the step of calculating, by the MCU, a rotational speed of the multipole magnet according to electrical signal variation of the selected Hall components specifically includes:

acquiring, by the MCU, electrical signal variation of any of the selected Hall components within a preset time; and calculating, by the MCU, the rotational speed of the multipole magnet according to the acquired electrical signal variation and the preset time.

There are a plurality of Hall components in the present invention, so the position of a magnet in the current multipole magnet can be known only according to a signal difference relation obtained from two adjacent Hall components.

Figure 10:
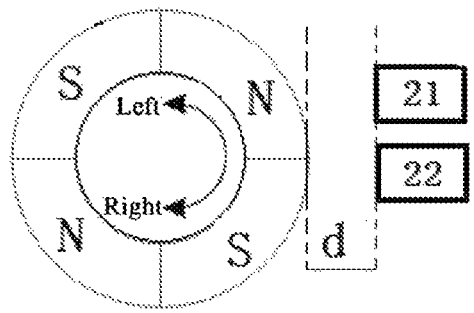
FIG. 10 is a structural diagram of specific embodiment for calculating rotation information of a magnetic roller device according to the present invention.
Figure 11:
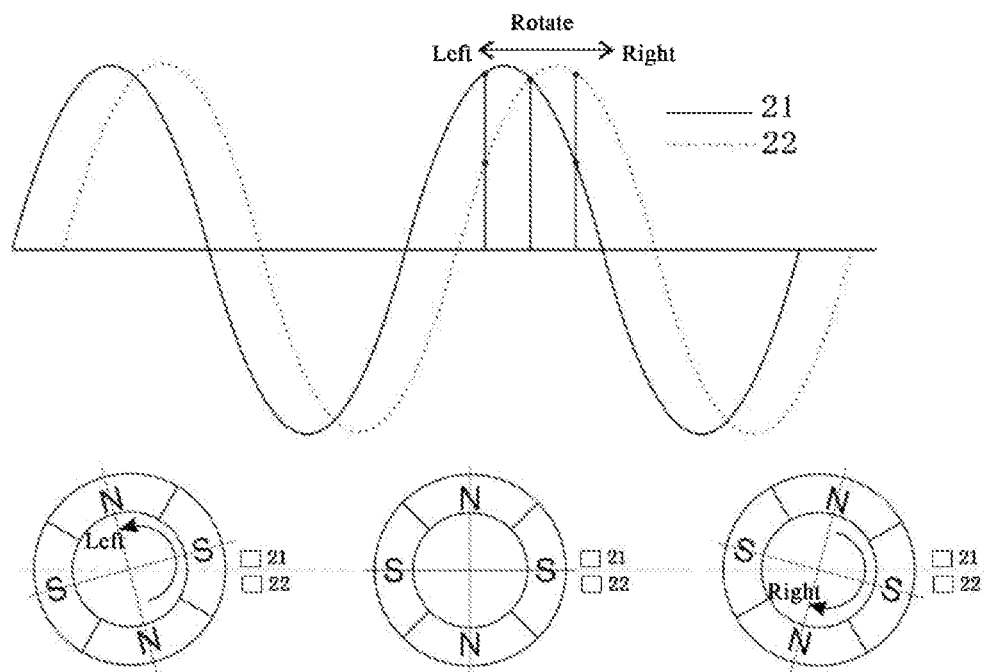
FIG. 11 is a diagram of relationships between rotation directions of the multipole magnet in FIG. 10 and signal waveforms output by the Hall component.

Specifically, by taking the multipole magnet, the Hall component 21, and the Hall component 22 shown in FIG. 10 as an example, relations between waveforms of the electrical signals output by the Hall components and rotation directions are as shown in FIG. 11. When the electrical signals output by the Hall component 21 and the Hall component 22 are equal in size, it means that the center of the current magnet in the multipole magnet is located in the middle of the two Hall components; when the value of the electrical signal output by the Hall component 21 is greater than the value of the electrical signal output by the Hall component 22, it can be known that the magnetic roller is rotating toward the direction of the Hall component 21; and when the value of the electrical signal output by the Hall component 22 is greater than the value of the electrical signal output by the Hall component 21, it can be known that the magnetic roller is rotating toward the direction of the Hall component 22. On the premise that the rotation direction is unchanged, if the electrical signals of the Hall component 21 and the Hall component 22 are the same, the relationship between the sizes of the electrical signals of the Hall component 21 and the Hall component 22 may be reversed. When the electrical signals of the Hall component 21 and the Hall component 22 change constantly, it also means that the magnetic roller keeps rotating. In unit time, variation of the electrical signal of the same Hall component is the rotational speed of the magnetic roller. The MCU can obtain a rotation direction and a relative rotational speed of the magnetic roller according to the above logic judgment principle and the statistics of electrical signal variation in unit time.

Figure 12:
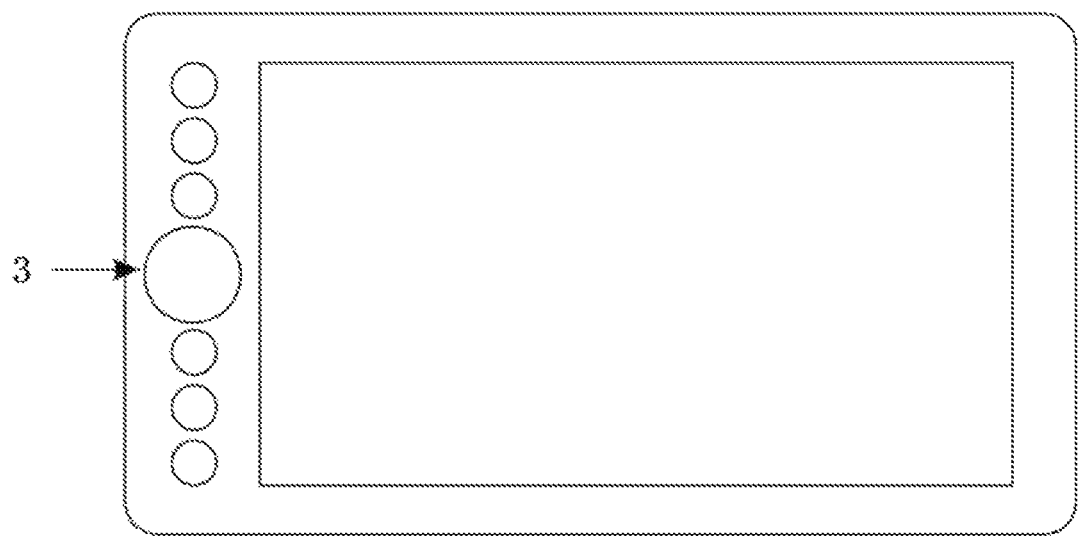
FIG. 12 is a schematic structural diagram of a handwriting tablet/drawing tablet.

To better describe the effect of the magnetic roller device in the present invention, a handwriting tablet/drawing tablet shown in FIG. 12 is introduced. As shown in FIG. 12, the handwriting tablet/drawing tablet is generally required to be suitable for left-handers and right-handers, so its USB outlet (i.e., USB interface) 3 is generally in the middle of the handwriting tablet/drawing tablet. In this way, no matter whether the handwriting tablet/drawing tablet turns 180 degrees left or 180 degrees right, the USB outlet is kept in the middle. The conventional mechanical roller occupies a lot of space on a circuit board, so the USB interface 3 may not fit in. In this way, only the distance between the roller and an edge of the board can be increased, or the roller is disposed at a non-center position (that is, the USB interface is placed at a position other than that shown in FIG. 12). However, the increase of the distance from the roller to the edge of the board increases the total cost accordingly, and it is not convenient to use the roller in the non-center position. Although the touch roller does not occupy too much space on a motherboard, its touchpad is another PCB. During assembly, it needs to be connected to the motherboard through a soft flat cable, which is of high complexity in production. Besides, the touch technology is easy to be disturbed and mistakenly touched, and also has a problem in consistency. Different from the touch roller and the mechanical roller, the magnetic roller device only requires disposing Hall components on the board, so there is enough space to place the USB interface 3. The magnetic roller device takes advantage of the Hall effect, requires no additional PCB board, is easy to implement, is small in size, is not easy to be disturbed and mistakenly touched, and has excellent production consistency.

Preferred embodiments of the present invention are specifically described above, but the present invention is not limited to the embodiments. Those skilled in the art can further make various equivalent transformations or replacements without departing from the concept of the present invention. The equivalent transformations or replacements are all encompassed in the scope defined by the claims of this application.

What is claimed is:

1. A magnetic roller device, comprising:
   a multipole magnet,
   an MCU,
   a plurality of Hall components, and
   a roller disposed on a handwriting device,
   wherein the multipole magnet is disposed on the roller, the multipole magnet comprises at least one pair of magnetic poles with opposite polarities, and output ends of the plurality of Hall components are all connected to an input end of the MCU;
   the plurality of Hall components are all located on a same plane of a magnetic field sensing space of the multipole magnet, and distances between each of the plurality of Hall components and the multipole magnet are equal; and
   a distance between two adjacent ones of the plurality of Hall components is less than half of a width of each magnetic pole in the multipole magnet.

2. The magnetic roller device of claim 1, wherein the rotation direction of the multipole magnet is perpendicular or parallel to a position of each of the Hall components.

3. The magnetic roller device of claim 1, wherein the multipole magnet is a radial magnet or an axial magnet.

4. The magnetic roller device of claim 1, wherein the plurality of Hall components are packaged in a same IC chip or respectively in different IC chips.

5. A method for calculating rotation information of a magnetic roller device, comprising the following steps:
   acquiring, by a plurality of Hall components, corresponding electrical signals during rotation of a multipole magnet and sending them to an MCU, wherein the multipole magnet comprises at least one pair of magnetic poles with opposite polarities, distances between each of the plurality of Hall components and the multipole magnet are equal, and the plurality of Hall components are all located on a same plane of a magnetic field sensing space of the multipole magnet; and
   judging and calculating, by the MCU, based on the electrical signals acquired by the plurality of Hall components to obtain rotation information of the multipole magnet, wherein the rotation information comprising position information and rotational speed information,
   wherein the step of judging and calculating, by the MCU, based on the electrical signals acquired by the plurality of Hall components to obtain rotation information of the multipole magnet specifically comprises:
      selecting, by the MCU, any two adjacent Hall components from the plurality of Hall components;
      making judgment, by the MCU, according to sizes of electrical signals of the selected Hall components to determine a rotation direction and a current position of the multipole magnet; and
      calculating, by the MCU, a rotational speed of the multipole magnet according to electrical signal variation of the selected Hall components,
      wherein the step of making judgment, by the MCU, according to sizes of electrical signals of the selected Hall components to determine a rotation direction and a current position of the multipole magnet is specifically: judging whether the electrical signals of the two selected Hall components are equal in size, and if yes, determining that the center of the current magnetic pole of the multipole magnet is in the middle of the two Hall components; and otherwise, determining that the multipole magnet is rotating toward a direction of the Hall component with a larger electrical signal, wherein distance between the two selected Hall components is less than half of a width of each magnetic pole in the multipole magnet.

6. The method of claim 5, wherein the step of calculating, by the MCU, a rotational speed of the multipole magnet according to electrical signal variation of the selected Hall components specifically comprises:
   acquiring, by the MCU, electrical signal variation of any of the selected Hall components within a preset time; and
   calculating, by the MCU, the rotational speed of the multipole magnet according to the acquired electrical signal variation and the preset time.

* * * * *

UNITED STATES PATENT AND TRADEMARK OFFICE
CERTIFICATE OF CORRECTION

| | | |
|---|---|---|
| PATENT NO. | : 11,714,099 B2 | Page 1 of 1 |
| APPLICATION NO. | : 16/964233 | |
| DATED | : August 1, 2023 | |
| INVENTOR(S) | : Yuanzhi Li | |

It is certified that error appears in the above-identified patent and that said Letters Patent is hereby corrected as shown below:

On the Title Page

Item (30) (Foreign Application Priority Data), should read:
Jan 23, 2018 (CN).........20181006216.X Signed and Sealed this
Thirteenth Day of February, 2024

Katherine Kelly Vidal
*Director of the United States Patent and Trademark Office*